Jan. 10, 1956     B. P. WALLACE ET AL     2,730,514
SHELL MOLD AND COMPOSITION FOR MAKING SAME
Filed Feb. 29, 1952
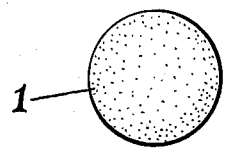
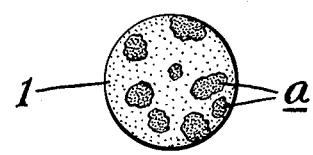
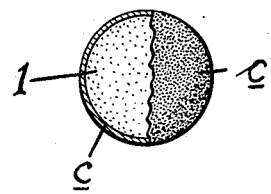
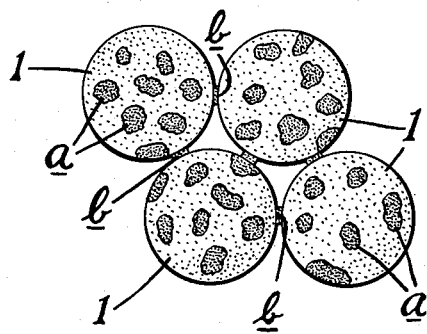
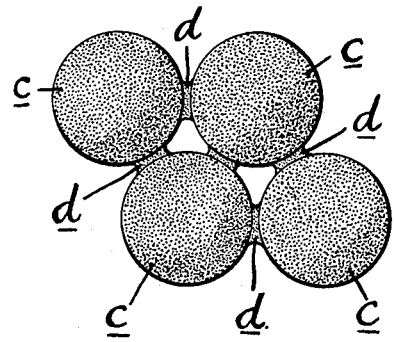
INVENTORS:
Burgess P. Wallace
Van Dyke Romney
BY
THEIR ATTORNEY.

2,730,514

SHELL MOLD AND COMPOSITION FOR MAKING SAME

Burgess P. Wallace, Brooklyn, and Van Dyke Romney, Richmond, N. Y., assignors to Whitehead Brothers Company, New York, N. Y., a corporation of New Jersey Application February 29, 1952, Serial No. 274,232

8 Claims. (Cl. 260—38)

This invention relates to the surface treatment of silica sand grains or other refractory particles to render the same peculiarly adapted for the production of molds or cores for the casting of ferrous and non-ferrous metals.

The principal object of our invention resides in the treatment of such refractory particles in such a manner as to materially increase the affinity of organic resinous bonds, such as hereinafter described, for the same, with the consequent increase in the decree of their adhesion thereto, whereby the bond content of a refractory resinous bond mix can be very substantially reduced, some 25% to 40%, below that which would be otherwise required in order to accomplish a like degree of adhesion had the refractory particles not been so treated. Other objects of the invention are hereinafter set forth.

As is well known, molecules having groups attached to the molecules in which the center of mass does not coincide with the center of the electrical charge are termed unbalanced. For example, molecules having an amine ($NH_2$) or methyl ($CH_3$) group are positively charged. Such groups as hydroxyl (OH), nitro ($NO_2$), nitrite (CN), etc., are negatively charged and able to respond to all types of stimuli having the correct characteristics, such as an electrostatic field. Further, such molecules have an electrostatic field around them, so that when two molecules, having polar groups approach each other, each polar group will exert an influence on the other. If the two groups are alike in charge, there will be a mutual repulsion. If unlike in charge, there will be an attraction.

Since the treated refractory particle has a continuous coating of the polarized material and since in the case of adhesion only the surfaces involved play any part in the union, the coated refractory material will behave as if it were a particle of a polar substance. Phenol formaldehyde, one of the synthetic resins which may be employed in carrying out our invention as herein described, is negatively polarized around the hydroxyl (OH) group. Therefore it has a negative electrostatic field around itself. If the polar substance employed as a wetting agent in the coating layer with which refractory grains are treated in accordance with our invention is an amine, it will have an electro-positive electrostatic field around itself. When these two fields approach each other there will be an attraction in the same manner as two magnetic fields of opposite charge will attract each other.

Our investigations have led to the discovery that by depositing on the surfaces of refractory grains substantially free from inorganic bonding substances, that are suitable for the production of metal-casting molds and cores, a surface layer of an amine, such for example as hexamethylenetetramine, that is polarized around the $NH_2$ group, or other surface-acting polar substance having an electro-positive charge to complement the inherent electro-negative charge of a synthetic phenol formaldehyde resin subsequently added to such treated grains, the following occurs:

1. The refractory grains are enveloped by a substance deformable in an electrostatic field, so that when the resinous bond is brought into contact therewith the active ends of both the resin and the amine coating complement and electrostatically attract each other much in the same manner as positive and negative charges will attract each other and therefore maximum adhesion is obtained.

2. Due to the presence of the polar substance on the refractory grains, there is an electrostatic attraction between such grains and resinous bond particles which keeps the latter from dusting out or "dusting thru" the refractory grains.

3. By the act of depositing the amines, which are surface active, on the refractory grains, the normal, relatively high surface tension of such grains is materially reduced and, therefore, when the resinous bond particles melt, the forces to be overcome by the same in spreading around the grains are relatively small and consequently the resinous particles readily wet the coating on the grains and thereby completely coat the same due to the fact that the latter have almost unlimited contact-point possibilities. As a result of such reduction in the surface tension of such grains to or even below that of the resinous bond particles, the contact angle of each of the latter with respect to the grains is decreased below 90 degrees. As explained in the Textbooks of Physical Chemistry by Samuel Glasstone, published 1940 by D. Van Nostrand & Co., page 474, the more acute the angle that a liquid substance forms with a solid substance, the greater the spreadability of the liquid upon the solid. It is well known in physical science that the greatest degree of adhesion between two particles is obtained when both particles are polar in nature, the polarity of one complementing the polarity of the other and on page 524 of said textbook an excellent definition of such polarity in this sense is found, it being stated: The constant "$\alpha$" is called the polarizability of the molecule, it is a measure of the ease with which the molecules can be polarized, that is, the ease of displacement of positive and negative charges with respect to each other is an electrical field.

A common ingredient of resinous bonds such as used in the making of molds and cores, in those cases where no inorganic bonds are employed, is the aforesaid synthetic phenol formaldehyde resin which is a polar substance that is polarized around the hydroxyl ion (OH ion). The refractory substance to which it, the resin, will be best and most strongly bonded in a mold or core containing the same will be one which has a degree of polarizability of sufficient magnitude to permit deformation of the molecule to such an extent that the polar ends thereof will join the polar ends of the resin. Such degree of deformability or polarizability is not present either in silica sand ($SiO_2$), zirconite ($ZrO_2$) or other generally acceptable refractories for making molds or cores and therefore the bonds formed between the resin and refractory particles are not of the maximum strength that is theoretically obtainable.

Another function directly related to the strength of molds or cores composed of a resin-bonded refractory, is the ability of the resin bond to easily and completely spread over and coat the refractory particles as, if it does not, then the particles thereof melt but do not spread or run completely around the refractory grains and, as a consequence, minute balls of the bond will form on the surface of such grains by melting, but these agglomerates of binder will not necessarily be at the points of contact of the refractory grains and so effective grain-to-grain adhesion of such grains cannot be accomplished. If, however, the bond is caused to so run completely around the grains of the refractory, any point of contact will be a point of adhesion.

Our invention is fully set forth in the following detailed description and the accompanying graphic drawings forming a part thereof in which Figure 1 is an elevation, greatly magnified, of a single grain of sand, shown as spherical in configuration for convenience of illustration;

Figure 2 is a similar view of a grain of sand such as exists in a so-called shell mold, isolated;

Figure 3 is a magnified elevation, partially broken away, of several adjacent sand grains such as exist in a shell mold, showing the same bonded together with a resinous binder;

Figure 4 is a magnified elevation of a single grain of sand, isolated, of a shell mold prepared with refractory particles that have been treated in accordance with our invention; and Figure 5 is a magnified elevation of several adjacent sand grains, isolated and greatly magnified, that are bonded together with a resinous bond, such as exist in a shell mold prepared in accordance with our invention.

Referring to the drawings, the numeral 1 designates a grain of sand and the reference letter $a$ the isolated patches or areas of resinous binder such as exist on grains of sand in a shell mold prepared in accordance with the method of making such molds set forth in the Fiat Final Report No. 1168, by W. C. McCulloch, which was published by the U. S. Department of Commerce on May 30, 1947. The reference letter $b$ designates the slender necks of resinous bond which unite the grains, when compacted together, of the shell mold described in such report and $c$ designates the homogeneous coating of resinous bond on refractory grains, such as sand grains for example which have been pre-treated with an amine as above specified prior to being mixed with a resinous bond. The reference letter $d$ designates the thick, sturdy necks of resinous bond which unite the treated refractory particles in a shell mold or other mold prepared therewith.

The surface treatment of refractory grains in accordance with our invention to prepare the same for use in making molds and cores, either of the conventional type or the shell mold type, is accomplished as follows:

*Example I*

In those cases where the treated grains are to be bonded at the foundry with synthetic phenol formaldehyde resin, then 1,000 lbs. of unbonded silica sand, zirconite, olivene or other suitable refractory, desirably of a selected grain fineness number between about 70 and 160 on the scale set forth in the Foundry Sand Testing Handbook, fifth edition (1944) of the American Foundrymen's Association, is placed in a suitable mixer having provision for heating the same and a solution of an amine, such as hexamethylenetetramine, in the proportion of ten pounds thereof to each 1,000 lbs. of the sand or other refractory used, is added thereto. Such solution of the amine is desirably composed of a mixture 10 lbs. of the same and 1.6 ounces of a compatible coloring matter such for example as sulfanilic acid-azo-diphenylamine-sodium dissolved in about 85 lbs. of water. This solution is thoroughly mixed with the refractory in a suitable agitating mixer and then heat is applied, with constant agitation of the mix, until the mass is dry and granular in which condition it is highly suitable for shipment to foundries wherein the same is intended for use in the manufacture of molds and cores.

*Example II*

In those cases where the treated grains are to be bonded at the foundry with synthetic urea formaldehyde resin, which is polarized in an electro positive direction around the $NH_2$ group, it is necessary to use a polar material having an electro-negative polarity around either its OH group, the $NO_2$ group or the CN group, as for example, para nitro-so-phenol, M-nitrophenol, 8-nitronaphthol and 2-naphtho-nitrile, in order to complement the polarity of the urea formaldehyde resin. Accordingly, in lieu of the amine used in Example I, a like amount of said electro-negative compounds are substituted therefor in the formula given in that example.

The procedure employed in making sand molds of the conventional type with our improved treated sand or like refractory is essentially the same as that now prevalent in foundries when making such sand molds with sand bonded with resinous binders.

In making cores for use in the conventional type of sand mold the treated sand is admixed with the particular synthetic resin for which it was intended to be used, namely either phenol formaldehyde resin or urea formaldehyde resin, in the proportion of 100 parts of treated sand to 1 part of the resin, together with about ½% or so of dextrine to impart the requisite green strength. The resultant mixture is rammed, jolted or blown into the core box and the core so formed is then removed and placed in an oven heated to a suitable temperature for a sufficient time to cure the resin.

In the production of shell molds with our treated refractory as delivered to the foundry, 100 parts thereof, either of the type set forth in Example I or Example II, is intimately admixed with finely ground synthetic phenol formaldehyde resin or synthetic urea formaldehyde resin, some 3 to 5 parts thereof, and the mix is then placed in a closed container mounted on trunnions and on top of which is then placed the selected pattern the temperature of which is raised to from 400° to 500° F. The container is then inverted and the mix is allowed to fall on the hot pattern plate and to remain thereon for about 5 to 20 seconds. During this latter period, the heat from the pattern will be transmitted back through the mix which will have become softened or melted by the heat of the pattern and the particles of the mix will tend to adhere to the treated grains. Then, when such action proceeds to a depth of about ¼ inch in thickness, the container is then reversed in the trunnions and thereupon the bulk of the unheated mix will fall back into the bottom of the container. The pattern with its shell of such mix is then withdrawn and placed in an oven for final cure at about 600° F. When so cured, the shells are detached from the pattern and subsequently two matching shells are clamped together and molten metal for making the desired casting is poured into the mold cavity thus formed. Where desirable, the clamped matching shells are re-inforced with backing material such as coarse steel shot or other suitable coarse refractory material prior to pouring the metal into the mold cavity.

The amount of synthetic resin employed in the manufacture of cores for use in the conventional type of sand mold may vary between about ½ part and 3 parts to each hundred parts of the treated refractory particles and the amount of synthetic resin employed when making shell molds in accordance with our invention may vary between about 2 and 9 parts thereof to each 100 parts of the refractory particles.

The amount of the polar material, calculated on a dry basis, that is applied as a first layer to the refractory grains, should range between one-tenth and three percent of the amount of such grains, by weight, and desirably between one and two percent.

Various modifications in the method and products herein described may be made without departing from the spirit of our invention as embraced within the scope of the appended claims.

Having thus described our invention what we claim is:

1. A shell mold whose walls are composed essentially of refractory inorganic grains, substantially free from any inorganic bond, which are individually coated with a layer consisting essentially of a polarized wetting agent, a second layer composed of a resinous bond superimposed on said first layer and of opposite polarity thereto which is compatible therewith, said wetting agent being adapted to intensify the bonding power of said bond.

2. A shell mold, as claimed in claim 1, wherein the polarized wetting agent is an amine polarized around an amine group thereof.

3. A shell mold, as claimed in claim 1, wherein the polarized wetting agent is a member of a group consisting of an amine polarized around an amine group thereof, a nitrile polarized around a nitro group thereof and an organic hydroxy compound polarized around an hydroxy group thereof.

4. A shell mold, as claimed in claim 1, wherein the bond is a member of group consisting of a urea formaldehyde resin and a phenol formaldehyde resin and is of opposite polarity to the polarized wetting agent employed.

5. In molding material for making metal-casting molds, the intermediate product consisting essentially of refractory grains enveloped by a dry layer consisting essentially of hexamethylenetetramine that is polarized in an electro-positive direction around an amine group, the amount of such amine ranging between $\frac{1}{10}\%$ and $3\%$, by weight, of such refractory.

6. The intermediate product for use in metal-casting consisting essentially of refractory grains enveloped by a dry layer of a polar compound which is a wetting agent on which is superimposed a second layer consisting essentially of a resinous bonding substance, said polar compound being of opposite polarity to that of said bonding substance, being compatible therewith and adapted to supplement its bonding power and constituting a member of the group consisting of a solid amine that is polarized in an electro-positive direction around an amine group, a solid organic compound polarized in an electro-negative direction around an OH radical, a solid organic compound polarized in an electro-negative direction around a nitro radical and a solid organic compound that is polarized in an electro-negative direction around the CN radical, the amount of such polar material ranging between one-tenth and three per cent, by weight, of such refractory grains.

7. The intermediate product as claimed in claim 6 wherein the amount of such polar material ranges between one-half and three per cent, by weight, of the refractory grains.

8. The intermediate product as claimed in claim 6 wherein the amount of such polar material ranges between one and two per cent, by weight, of the refractory grains.

References Cited in the file of this patent

UNITED STATES PATENTS

| | | |
|---|---|---|
| 2,201,321 | Robie | May 21, 1940 |
| 2,398,047 | Schmidt | Apr. 9, 1946 |
| 2,517,815 | Weston | Aug. 8, 1950 |
| 2,623,865 | Dietz | Dec. 30, 1952 |
| 2,656,327 | Van Wirt et al. | Oct. 20, 1953 |

OTHER REFERENCES

FIAT Final Report No. 1168, The C Process of Making Molds and Cores for Foundry Use. Received April 8, 1948.